US012603607B2

(12) United States Patent
Zhou et al.

(10) Patent No.: US 12,603,607 B2
(45) Date of Patent: Apr. 14, 2026

(54) SHUTDOWN DEVICE CONTROL METHOD, SYSTEM AND APPARATUS, AND SHUTDOWN CONTROLLER

(71) Applicant: ALTENERGY POWER SYSTEM INC., Jiaxing (CN)

(72) Inventors: Dongming Zhou, Haining (CN); Yuhao Luo, Haining (CN)

(73) Assignee: ALTENERGY POWER SYSTEM INC., Jiaxing (CN)

( * ) Notice: Subject to any disclaimer, the term of this patent is extended or adjusted under 35 U.S.C. 154(b) by 229 days.

(21) Appl. No.: 18/701,233

(22) PCT Filed: Mar. 14, 2022

(86) PCT No.: PCT/CN2022/080605
§ 371 (c)(1),
(2) Date: Apr. 14, 2024

(87) PCT Pub. No.: WO2023/159687
PCT Pub. Date: Aug. 31, 2023

(65) Prior Publication Data
US 2024/0405717 A1 Dec. 5, 2024

(30) Foreign Application Priority Data

Feb. 22, 2022 (CN) .......................... 202210162835.1

(51) Int. Cl.
*H02S 50/10* (2014.01)
*H02H 7/20* (2006.01)
(Continued)

(52) U.S. Cl.
CPC .............. *H02S 50/10* (2014.12); *H02H 7/20* (2013.01); *H02J 3/001* (2020.01); *H02J 3/381* (2013.01); *H02J 2300/26* (2020.01)

(58) Field of Classification Search
CPC .... H02H 3/20; H02H 3/24; H02H 7/20; H02J 3/00; H02J 3/001; H02J 3/14; H02J 3/38;
(Continued)

(56) References Cited

U.S. PATENT DOCUMENTS

2020/0067452 A1 2/2020 Yang et al.
2021/0391710 A1* 12/2021 Yang ........................ H02J 3/381
(Continued)

FOREIGN PATENT DOCUMENTS

CA 3049551 A1 2/2020
CN 108832893 A * 11/2018 ............. G05B 19/04
(Continued)

OTHER PUBLICATIONS

Machine translation of Yang et al. Chinese Patent Document CN 108832893 A Nov. 2018 (Year: 2018).*
(Continued)

*Primary Examiner* — Kevin J Comber
(74) *Attorney, Agent, or Firm* — Yue (Robert) Xu; Apex Attorneys at Law, LLP

(57) ABSTRACT

A shutdown device control method, system and apparatus, and a shutdown controller. If the shutdown controller detects that an input voltage of the shutdown controller is reduced, when the input voltage of the shutdown controller is reduced to a preset protection voltage but has not been reduced to an undervoltage protection threshold voltage, the shutdown controller controls the shutdown of a shutdown device connected to a power supply photovoltaic assembly that supplies power to the shutdown controller, so that a bypass diode connected to the power supply photovoltaic assembly bypasses the power supply photovoltaic assembly, so that the power supply photovoltaic assembly only supplies power to the shutdown controller. After the shutdown device connected to the power supply photovoltaic assembly is shut
(Continued)

down, the power supply photovoltaic assembly cannot output any voltage to a photovoltaic inverter apparatus, but voltages outputted by the power supply photovoltaic assembly are all supplied to the shutdown controller to ensure the normal operation of the shutdown controller, thereby ensuring that photovoltaic assemblies, other than the power supply photovoltaic assembly, among photovoltaic assemblies corresponding to the shutdown controller still output voltages to the photovoltaic inverter apparatus, and avoiding large fluctuations in the voltage of the photovoltaic inverter apparatus.

10 Claims, 8 Drawing Sheets

(51) Int. Cl.
    H02J 3/00         (2026.01)
    H02J 3/001        (2026.01)
    H02J 3/38         (2026.01)
(58) Field of Classification Search
    CPC ....... H02J 3/381; H02J 2300/26; H02S 50/10;
                    Y02B 70/3225; Y02E 10/56; Y04S
                                                    20/222
    USPC ............................................................ 361/1
    See application file for complete search history.

(56)                    References Cited

U.S. PATENT DOCUMENTS

2023/0126969 A1      4/2023   Yang et al.
2023/0291201 A1 *    9/2023   Yang ........................ H02J 3/381

FOREIGN PATENT DOCUMENTS

CN          109038669  A      12/2018
CN          111313825  A  *    6/2020   ............ H02S 40/30
CN          111478290  A       7/2020
CN          111585308  A       8/2020
CN          111934352  A  *   11/2020   .............. H02H 7/00
CN          113489052  A      10/2021
CN          113629771  A      11/2021
CN          113964863  A       1/2022
CN          215498288  U       1/2022
CN          114050811  A       2/2022

OTHER PUBLICATIONS

Machine translation of Zhou et al. Chinese Patent Document CN 111313825 A Jun. 2020 (Year: 2020).*
Machine translation of Zhou et al. Chinese Patent Document CN 111934352 A Oct. 2020 (Year: 2020).*
International Search Report for PCT/CN2022/080605 mailed Nov. 22, 2022, ISA/CN.

* cited by examiner

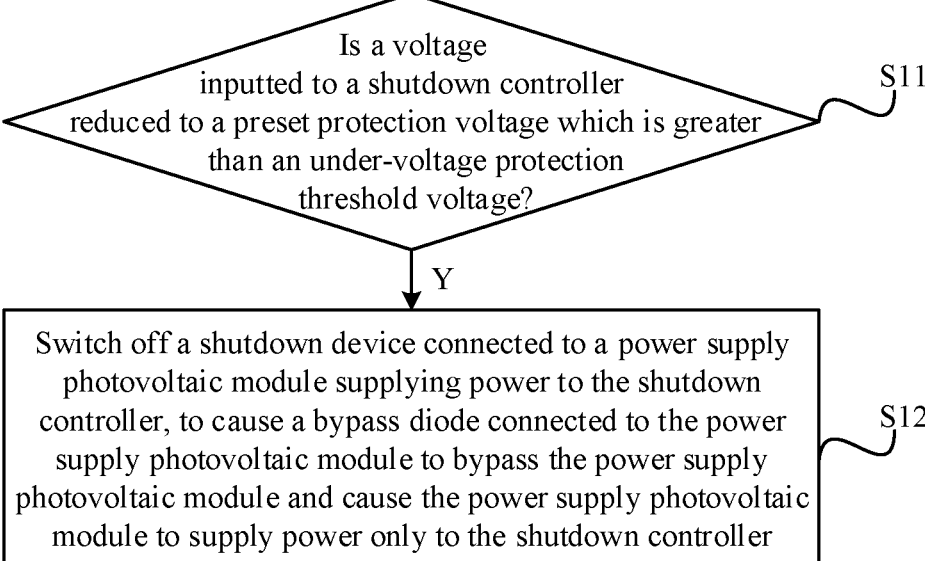

Is a voltage
inputted to a shutdown controller
reduced to a preset protection voltage which is greater
than an under-voltage protection
threshold voltage?          S11

Y

Switch off a shutdown device connected to a power supply
photovoltaic module supplying power to the shutdown
controller, to cause a bypass diode connected to the power
supply photovoltaic module to bypass the power supply
photovoltaic module and cause the power supply photovoltaic
module to supply power only to the shutdown controller          S12

Figure 1

SHUTDOWN DEVICE CONTROL METHOD, SYSTEM AND APPARATUS, AND SHUTDOWN CONTROLLER

The present application is the US national phase of International application No. PCT/CN2022/080605, filed on Mar. 14, 2022, titled "SHUTDOWN DEVICE CONTROL METHOD, SYSTEM AND APPARATUS, AND SHUTDOWN CONTROLLER", which claims priority to Chinese Patent Application No. 202210162835.1, titled "SHUTDOWN DEVICE CONTROL METHOD, SYSTEM AND APPARATUS, AND SHUTDOWN CONTROLLER", filed on Feb. 22, 2022 with the China National Intellectual Property Administration, both of which are incorporated herein by reference in their entireties.

FIELD

The present disclosure relates to the field of electric energy conversion, and in particular to a method, system, and apparatus for controlling shutdown devices, and a shutdown controller.

BACKGROUND

Grid-connected photovoltaic power technologies are developing at an incredibly rapid pace by virtue of renewability and cleaning of solar energy. Generally, in a photovoltaic system, a photovoltaic module string including a plurality of photovoltaic modules connected in series is connected to a photovoltaic inverter device by which direct current power outputted by the photovoltaic module string is converted into alternating current power fed into a power grid. The photovoltaic module string outputs high voltage direct current power, which is likely to result in damage to workers and fire hazards. The photovoltaic system that is in operation necessitates the photovoltaic inverter device being protected against electric arcs. That is, the photovoltaic inverter device is switched off immediately when an electric arc is detected. However, a direct current cable that strings the photovoltaic modules still outputs high-voltage direct current power even though the photovoltaic inverter device has been switched off, and thus is still hazardous. Therefore, in the conventional technology, the photovoltaic modules are usually connected to shutdown devices respectively. Output terminals of the shutdown devices are connected in series, and then connected to the photovoltaic inverter device to ensure that the photovoltaic modules are connected in series. The shutdown devices are controlled by a shutdown controller. When it is to switch off the photovoltaic inverter device, the shutdown devices connected to the photovoltaic modules are connected accordingly to reduce the voltage on the direct current cable.

The shutdown controller is usually powered by a photovoltaic module connected to a shutdown device controlled by the shutdown controller. That is, the photovoltaic module not only outputs direct current power to the photovoltaic inverter device, but also supplies power to the shutdown controller. When the photovoltaic module supplying power to the shutdown controller is accidentally shaded and thus a voltage outputted by the photovoltaic module is reduced to an under-voltage protection threshold voltage, the shutdown controller is powered off accordingly, so that the shutdown devices controlled by the shutdown controller are switched off and a circuit between photovoltaic modules not shaded and the photovoltaic inverter device is cut off simultaneously, resulting in a large fluctuation in the voltage inputted to the photovoltaic inverter device and therefore the photovoltaic inverter device cannot operate stably.

SUMMARY

A method, system, and apparatus for controlling shutdown devices, and a shutdown controller are provided according to the present disclosure. After the shutdown device connected to the power supply photovoltaic module is switched off, a voltage outputted by the power supply photovoltaic module cannot be inputted to the photovoltaic inverter device and is completely supplied to the shutdown controller, which ensures that the shutdown controller operates properly, so that other photovoltaic modules corresponding to the shutdown controller than the power supply photovoltaic module still output voltages to the photovoltaic inverter device, thereby avoiding a large fluctuation in the voltage inputted to the photovoltaic inverter device.

In order to solve the above technical problems, according to the present disclosure, there is provided a method for controlling shutdown devices, wherein the method is applied to shutdown controllers, each of the shutdown controllers controls a plurality of the shutdown devices that are arranged at positive output terminals of photovoltaic modules in one-to-one correspondence, the photovoltaic modules corresponding to a same one of the shutdown controllers are connected in series via the shutdown devices connected to the photovoltaic modules to form a photovoltaic module string, a positive output terminal of the photovoltaic module string is connected to a positive input terminal of a photovoltaic inverter device, a negative output terminal of the photovoltaic module string is connected to a negative input terminal of the photovoltaic inverter device, a bypass diode is connected in parallel between a positive output terminal and a negative output terminal of each of the photovoltaic modules, and the method includes:

determining whether a voltage inputted to one of the shutdown controllers is reduced to a preset protection voltage, wherein the preset protection voltage is greater than a under-voltage protection threshold voltage; and switching off a shutdown device connected to a power supply photovoltaic module supplying power to the one of the shutdown controllers if the voltage inputted to the one of the shutdown controllers is reduced to the preset protection voltage, to cause the bypass diode connected to the power supply photovoltaic module to bypass the power supply photovoltaic module and cause the power supply photovoltaic module to supply power only to the one of the shutdown controllers.

Preferably, before determining whether a voltage inputted to one of the shutdown controllers is reduced to a preset protection voltage, the method further includes:

generating delays of the shutdown devices connected to the one of the shutdown controllers after the one of the shutdown controllers is started, where the delays each are greater than duration for which the photovoltaic inverter device performs maximum power point tracking, an absolute value of a difference between a delay of an (i+1)-th shutdown device and a delay of an i-th shutdown device is greater than the duration for which the photovoltaic inverter device performs the maximum power point tracking, N is greater than i and represents the total number of the shutdown devices connected to the one of the shutdown controllers, and N and i are each a positive integer;

determining whether an enabling signal outputted by the photovoltaic inverter device is received; and switching on one of the shutdown devices after the delay corresponding to the one of the shutdown devices elapses if the enabling signal is received, to cause the photovoltaic module connected to the one of the shutdown devices to output a voltage to the photovoltaic inverter device.

Preferably, the generating of delays of the shutdown devices connected to the one of the shutdown controllers after the one of the shutdown controllers is started includes:

determining preset delays determined in advance for the shutdown devices as the delays of the shutdown devices.

Preferably, before generating delays of the shutdown devices connected to the one of the shutdown controllers after the one of the shutdown controllers is started, the method further includes:

starting the one of the shutdown controllers after a starting delay corresponding to the one of the shutdown controllers elapses from a time instant when the one of the shutdown controllers is powered on, wherein the shutdown controllers are different in the starting delay.

Preferably, before starting the one of the shutdown controllers after a starting delay corresponding to the one of the shutdown controllers elapses from a time instant when the one of the shutdown controllers is powered on, the method further includes:

generating correspondence between a restarting ordinal and the starting delay of the one of the shutdown controllers; and determining the starting delay of the one of the shutdown controllers based on the current restarting ordinal of the one of the shutdown controllers and the correspondence.

Preferably, before determining whether a voltage inputted to one of the shutdown controllers is reduced to a preset protection voltage, the method further includes:

enabling a first preset clock signal and a second preset clock signal after the one of the shutdown controllers is started, wherein a first clock period of the first preset clock signal is greater than the duration for which the photovoltaic inverter device performs the maximum power point tracking, and a second clock period of the second preset clock signal is a preset multiple of the first clock period; and switching on a j-th shutdown device after a j-th cycle of the second clock signal elapses if the enabling signal is received, to cause a photovoltaic module connected to the j-th shutdown device to output a voltage to the photovoltaic inverter device, wherein N is greater than or equal to j, and j is a positive integer.

Preferably, after switching off a shutdown device connected to a power supply photovoltaic module supplying power to the one of the shutdown controllers, the method further includes:

determining whether the voltage inputted to the one of the shutdown controllers is reduced to the under-voltage protection threshold voltage; and switching off the shutdown devices connected to the one of the shutdown controllers if the voltage inputted to the one of the shutdown controllers is reduced to the under-voltage protection threshold voltage.

In order to solve the above technical problems, according to the present disclosure, there is provided a system for controlling shutdown devices, wherein the system is applied to shutdown controllers, each of the shutdown controllers controls a plurality of the shutdown devices that are arranged at positive output terminals of photovoltaic modules in one-to-one correspondence, the photovoltaic modules corresponding to a same one of the shutdown controllers are connected in series via the shutdown devices connected to the photovoltaic modules to form a photovoltaic module string, a positive output terminal of the photovoltaic module string is connected to a positive input terminal of a photovoltaic inverter device, a negative output terminal of the photovoltaic module string is connected to a negative input terminal of the photovoltaic inverter device, a bypass diode is connected in parallel between a positive output terminal and a negative output terminal of each of the photovoltaic modules, and the system includes:

a determination unit configured to determine whether a voltage inputted to one of the shutdown controllers is reduced to a preset protection voltage which is greater than an under-voltage protection threshold voltage; and a control unit configured to switch off a shutdown device connected to a power supply photovoltaic module supplying power to the one of the shutdown controllers if the voltage inputted to the one of the shutdown controllers is reduced to the preset protection voltage, to cause the bypass diode connected to the power supply photovoltaic module to bypass the power supply photovoltaic module and cause the power supply photovoltaic module to supply power only to the one of the shutdown controllers.

In order to solve the above technical problems, according to the present disclosure, there is provided an apparatus for controlling shutdown devices including:

a memory configured to store a computer program; and a processor configured to execute the computer program to implement the method for controlling shutdown devices described above.

In order to solve the above technical problems, according to the present disclosure, there is provided a shutdown controller including the apparatus for controlling shutdown devices described above, and further including:

a control-signal sampling module configured to sample an enabling signal outputted by a photovoltaic inverter device; and a communication module configured to transmit the enabling signal to the apparatus for controlling shutdown devices, wherein an input terminal of the communication module is connected to the control-signal sampling module, and an output terminal of the communication module is connected to an input terminal of the apparatus for controlling shutdown devices.

A method, system and apparatus for controlling shutdown devices are provided according to the present disclosure. In the solutions, the shutdown controller switches off the shutdown device connected to the power supply photovoltaic module supplying power to the shutdown controller when it is detected that the voltage inputted to the shutdown controller is reduced to a preset protection voltage and does not reach the under-voltage protection threshold voltage, so that a bypass diode connected to the power supply photovoltaic module bypasses the power supply photovoltaic module and the power supply photovoltaic module supplies power only to the shutdown controller. It can be seen that after the shutdown device connected to the power supply photovoltaic module is switched off, the voltage outputted by the power supply photovoltaic module cannot be inputted to the photovoltaic inverter device and is completely supplied to the shutdown controller, which ensures that the shutdown controller operates properly, so that other photovoltaic modules corresponding to the shutdown controller than the power supply photovoltaic module still output voltages to the photovoltaic inverter device, thereby avoiding a large fluctuation in the voltage inputted to the photovoltaic inverter device.

BRIEF DESCRIPTION OF THE DRAWINGS

In order to more clearly describe technical solutions in the embodiments of the present disclosure, drawings to be used in the description of the conventional technology or the embodiments are briefly introduced hereinafter. It is apparent that the drawings described below show merely some embodiments of the present disclosure, and those skilled in the art can obtain other drawings based on the provided drawings without any creative effort.

FIG. 1 is a flowchart of a method for controlling shutdown devices according to the present disclosure;

DETAILED DESCRIPTION

Figure 2:
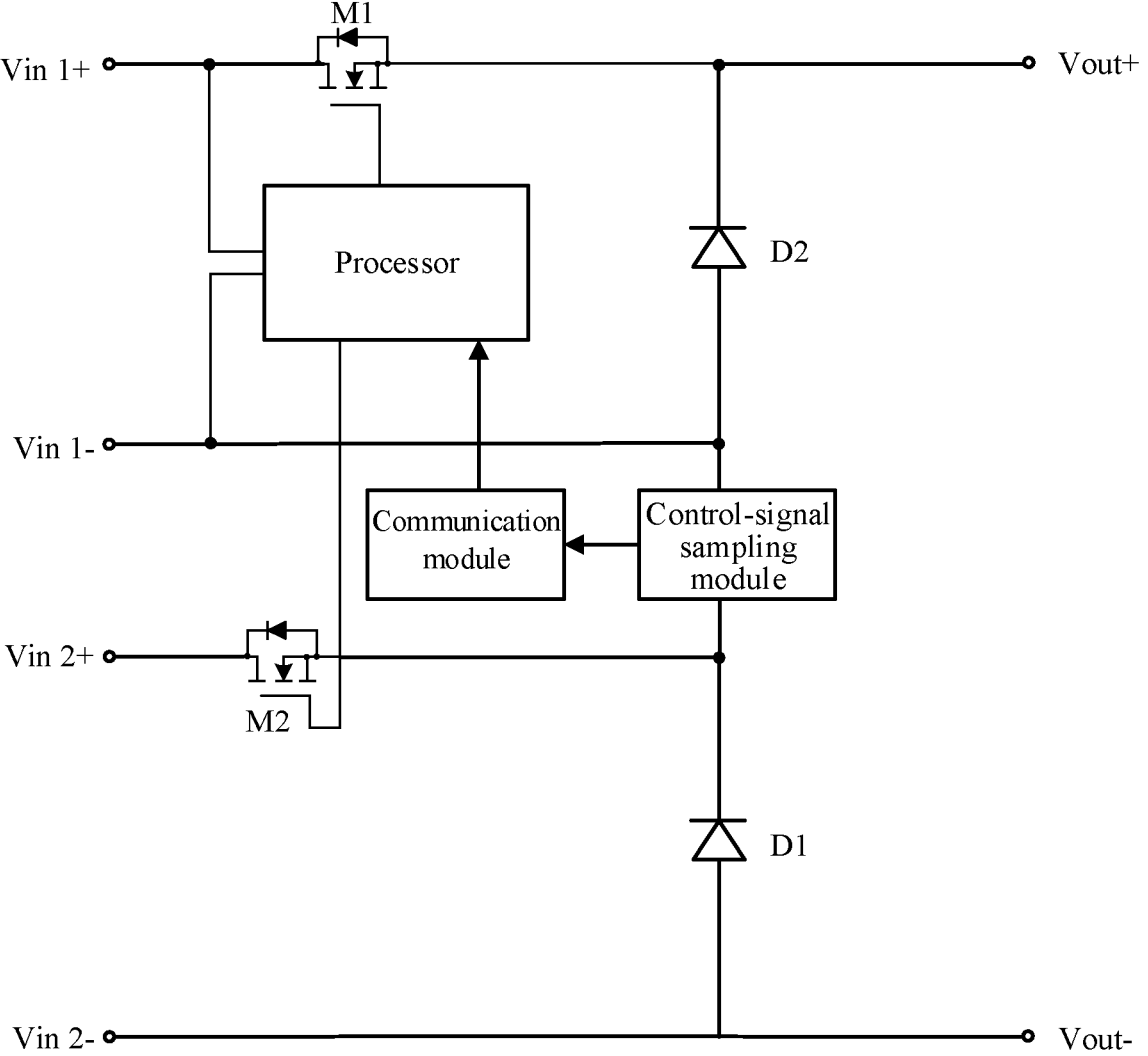
FIG. 2 is a schematic structural diagram of photovoltaic modules and a shutdown controller according to the present disclosure.

A method, system, and apparatus for controlling shutdown devices, and a shutdown controller are provided according to the present disclosure. After the shutdown device connected to a power supply photovoltaic module is switched off, a voltage outputted by the power supply photovoltaic module cannot be inputted to a photovoltaic inverter device and is completely supplied to the shutdown controller, which ensures that the shutdown controller operates properly, so that other photovoltaic modules corresponding to the shutdown controller than the power supply photovoltaic module still output voltages to the photovoltaic inverter device, thereby avoiding a large fluctuation in the voltage inputted to the photovoltaic inverter device.

In order to make objectives, technical solutions and advantages of the present disclosure more clear, technical solutions in the embodiments of the present disclosure will be clearly and completely described below in conjunction with the drawings of the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

Referring to FIG. 1, FIG. 1 is a flowchart of a method for controlling shutdown devices according to the present disclosure. The method is applied to a shutdown controller. Each shutdown controller controls a plurality of shutdown devices, and the shutdown devices are arranged at positive output terminals of photovoltaic modules in one-to-one correspondence. Photovoltaic modules corresponding to a same shutdown controller are connected in series via shutdown devices connected to the photovoltaic modules to form a photovoltaic module string. A positive output terminal of the photovoltaic module string is connected to a positive input terminal of a photovoltaic inverter device, and a negative output terminal of the photovoltaic module string is connected to a negative input terminal of the photovoltaic inverter device. A bypass diode is connected in parallel between the positive output terminal and the negative output terminal of the photovoltaic module. The method includes the following steps.

At step S11, it is determined whether a voltage inputted to the shutdown controller is reduced to a preset protection voltage which is greater than a under-voltage protection threshold voltage.

At step S12, a shutdown device connected to a power supply photovoltaic module supplying power to the shutdown controller is switched off when the voltage inputted to the shutdown controller is reduced to the preset protection voltage, to cause a bypass diode connected to the power supply photovoltaic module to bypass the power supply photovoltaic module and cause the power supply photovoltaic module to supply power only to the shutdown controller.

Referring to FIG. 2, FIG. 2 is a schematic structural diagram of photovoltaic modules and a shutdown controller according to the present disclosure, in which it takes one shutdown controller being connected to two shutdown devices as an example. In FIG. 2, Vin1+ indicates a positive output terminal of a first photovoltaic module, Vin1− indicates a negative output terminal of the first photovoltaic module, Vin2+ indicates a positive output terminal of a second photovoltaic module, Vin2− indicates a negative output terminal of the second photovoltaic module, M1 indicates a shutdown device connected to the first photovoltaic module, M2 indicates a shutdown device connected to the second photovoltaic module, D2 indicates a bypass diode connected in parallel at the output terminals of the first photovoltaic module, and D1 indicates a bypass diode connected in parallel at the output terminals of the second photovoltaic module. Vout+ indicates a positive output terminal of a photovoltaic module string formed by the first photovoltaic module and the second photovoltaic module that are connected in series, and the positive output terminal of the photovoltaic module string is connected to the positive input terminal of the photovoltaic inverter device. Vout− indicates a negative output terminal of the photovoltaic module string, and the negative output terminal of the photovoltaic module string is connected to the negative input terminal of the photovoltaic inverter device.

As can be seen from FIG. 2, the shutdown controller is powered by the first photovoltaic module. When the first photovoltaic module is accidentally shaded and thus a voltage outputted by the first photovoltaic module is reduced to the under-voltage protection threshold voltage, the shutdown controller is accordingly powered off. At this time, even if the second photovoltaic module can operate properly, the shutdown device connected to the second photovoltaic module is switched off. In a case that more photovoltaic modules are connected to a same shutdown controller, the more photovoltaic modules stop outputting simultaneously, resulting in a large fluctuation in the voltage inputted to the photovoltaic inverter device and therefore the photovoltaic inverter device cannot operate properly.

Figure 3:
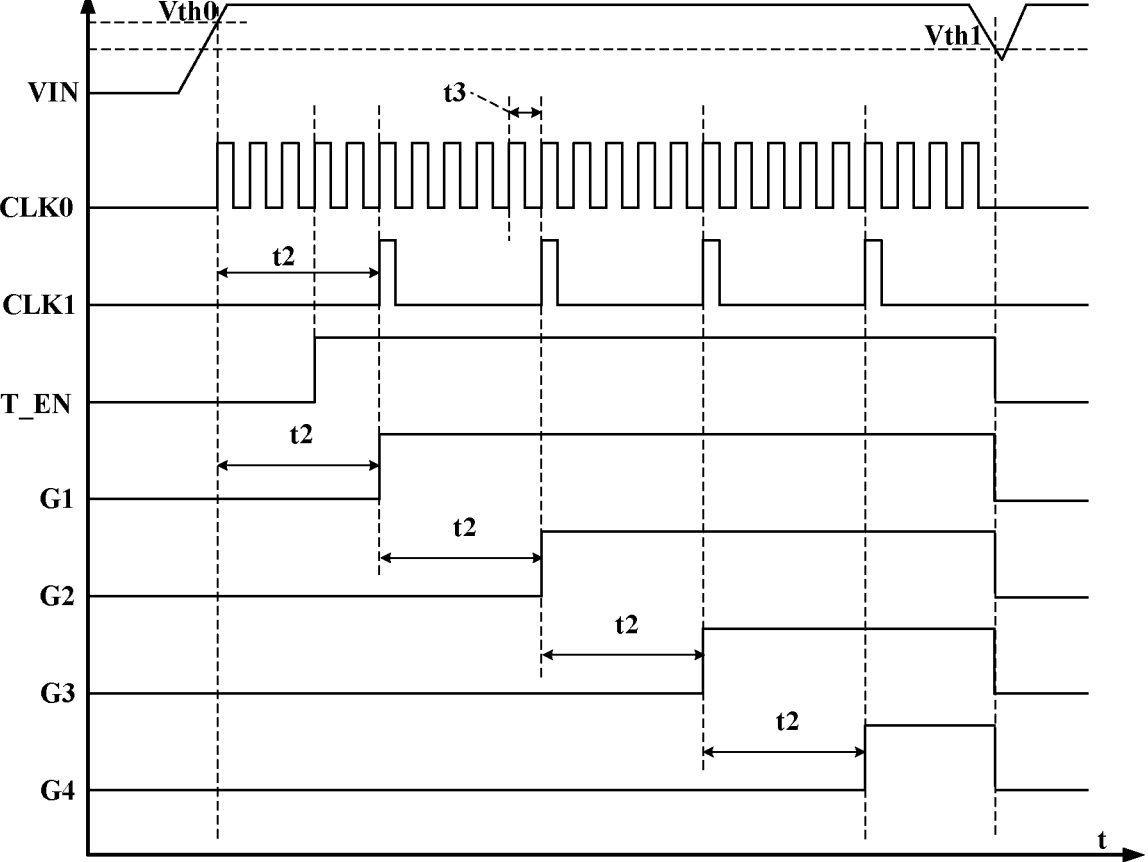
FIG. 3 is a schematic diagram of a voltage inputted to a shutdown controller in the conventional technology.
Figure 4:
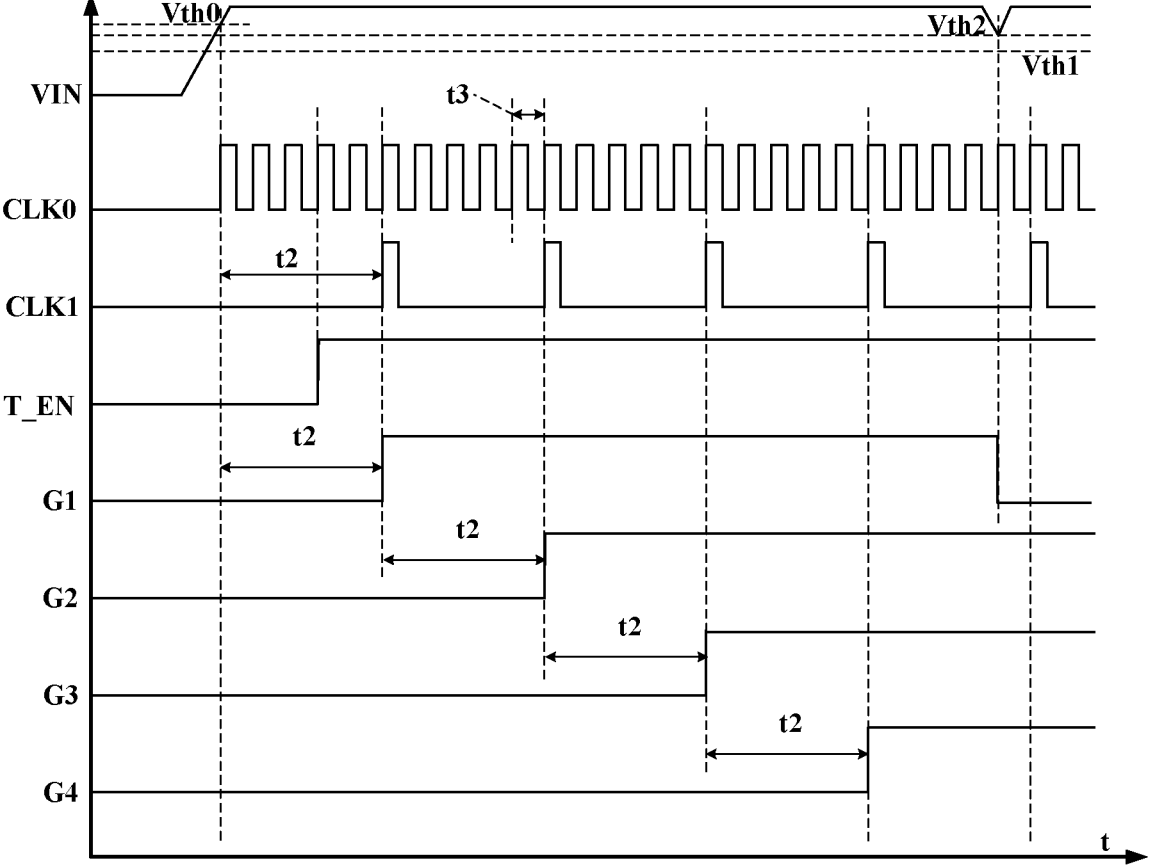
FIG. 4 is a schematic diagram of a voltage inputted to a shutdown controller according to the present disclosure.

In order to solve the above technical problems, in the present disclosure, during controlling the shutdown devices, detection of reduction in the voltage inputted to the shutdown controller indicates that the voltage outputted by the photovoltaic module supplying power to the shutdown controller is reduced. Here, the photovoltaic module supplying power to the shutdown controller is referred to as a power supply photovoltaic module. When it is detected that the voltage inputted to the shutdown controller is reduced to the preset protection voltage and does not reach the under-voltage protection threshold voltage, the shutdown controller remains being powered properly and operates properly. Referring to FIG. 3 and FIG. 4, FIG. 3 is a schematic diagram of a voltage inputted to a shutdown controller in the conventional technology and FIG. 4 is a schematic diagram of a voltage inputted to a shutdown controller according to the present disclosure. In FIG. 3, VIN represents the voltage inputted to the shutdown controller, Vth0 represents a starting voltage of the shutdown controller, and Vth1 represents the under-voltage protection threshold voltage. Vth2 in FIG. 4 represents the preset protection voltage. Considering that the voltage inputted to the shutdown controller is reduced as the voltage outputted by the power supply photovoltaic module is reduced, the shutdown device connected to the power supply photovoltaic module is switched off first, so that the power supply photovoltaic module stops outputting a voltage to the inverter and supplies power only to the shutdown controller. Although the voltage outputted by the power supply photovoltaic module is reduced, the reduced voltage is completely supplied to the shutdown controller. Therefore, the shutdown controller can operate properly, and shutdown devices connected to other photovoltaic modules corresponding to the shutdown controller than the power supply photovoltaic module are not switched off due to power failure, so as to avoid a large fluctuation in the voltage inputted to the photovoltaic inverter device, thereby ensuring the stable operation of the photovoltaic inverter device.

Figure 5:
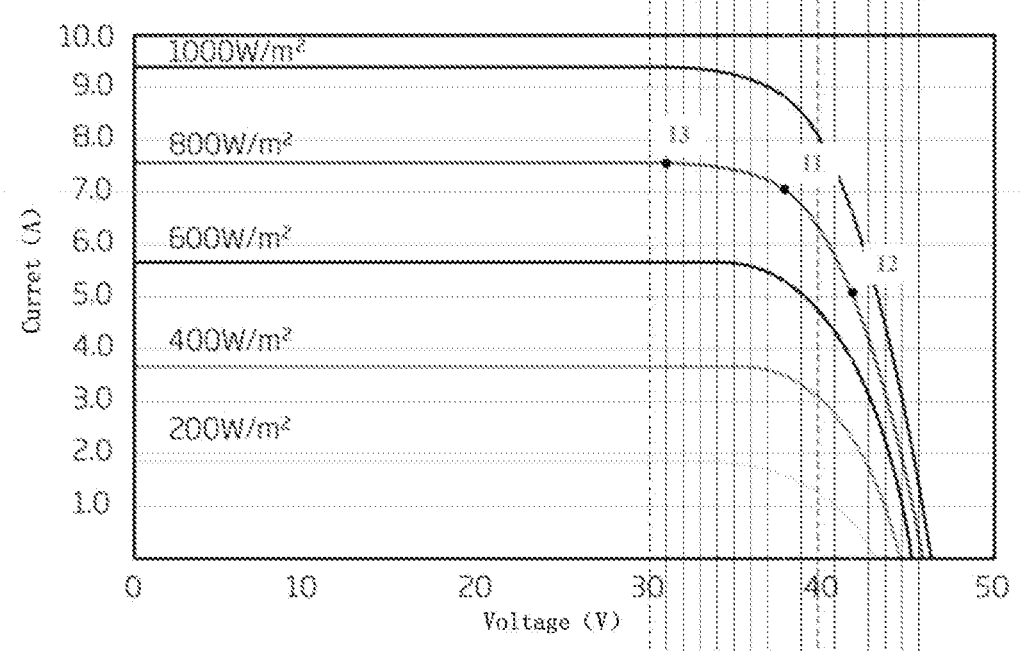
FIG. 5 is a schematic diagram showing the corresponding relationship between a voltage and a current of a photovoltaic module according to the present disclosure and illumination intensity.

Referring to FIG. 5, FIG. 5 is a schematic diagram showing the corresponding relationship between a voltage and a current of a photovoltaic module according to the present disclosure and illumination intensity. As can be seen from FIG. 5, in a case that the photovoltaic module is subjected to illumination of 200 W/m², the photovoltaic module outputs a current about 1.9 A even if a voltage outputted by the photovoltaic module is reduced to 10V. The shutdown controller is required to be powered only at a milliampere level for proper operation. Therefore, the power supply photovoltaic module can still supply power to the shutdown controller after the shutdown device connected to the power supply photovoltaic module is switched off, ensuring that the shutdown controller operates properly.

It should further be noted that since the output terminal of the photovoltaic module is connected in parallel with a bypass diode, the photovoltaic module cannot output a voltage to the photovoltaic inverter device when the shutdown device connected to the photovoltaic module is switched off. However, other photovoltaic modules connected in series to the photovoltaic module output voltages to the inverter via the bypass diode connected to the photovoltaic module, ensuring that other photovoltaic modules output properly.

In a preferred embodiment, after the shutdown device connected to the power supply photovoltaic module supplying power to the shutdown controller is switched off, the method further includes: determining whether the voltage inputted to the shutdown controller is reduced to the under-voltage protection threshold voltage; and switching off the shutdown devices connected to the shutdown controller in a case that the voltage inputted to the shutdown controller is reduced to the under-voltage protection threshold voltage.

In addition, darkness or malfunction likely results in that the voltage inputted to the shutdown controller continues to be reduced and reaches the under-voltage protection threshold voltage even after the shutdown device connected to the power supply photovoltaic module is switched off. In this case, the shutdown controller is powered off to directly switch off all shutdown devices connected to the shutdown controller, thereby preventing the photovoltaic inverter device from malfunctioning due to being affected.

In summary, after the shutdown device connected to the power supply photovoltaic module is switched off, the voltage outputted by the power supply photovoltaic module cannot be inputted to the photovoltaic inverter device and is completely supplied to the shutdown controller, which ensures that the shutdown controller operates properly, so that other photovoltaic modules corresponding to the shutdown controller than the power supply photovoltaic module still output voltages to the photovoltaic inverter device, thereby avoiding a large fluctuation in the voltage inputted to the photovoltaic inverter device.

On the basis of the above embodiments, in a preferred embodiment, before it is determined whether the voltage inputted to the shutdown controller is reduced to the preset protection voltage, the method further includes: generating delays of the shutdown devices connected to the shutdown controller after the shutdown controller is started, where the delays each are greater than duration for which the photovoltaic inverter device performs maximum power point tracking, an absolute value of a difference between a delay of an (i+1)-th shutdown device and a delay of an i-th shutdown device is greater than the duration for which the photovoltaic inverter device performs the maximum power point tracking, N is greater than i and represents the total number of the shutdown devices connected to the shutdown controller, and N and i are each a positive integer; determining whether an enabling signal outputted by the photovoltaic inverter device is received; and switching on one of the shutdown devices after the delay corresponding to the one of the shutdown devices elapses if the enabling signal is received, to cause the photovoltaic module connected to the one of the shutdown devices to output a voltage to the photovoltaic inverter device.

When a plurality of photovoltaic modules output voltages to the photovoltaic inverter device simultaneously, the voltage inputted to the photovoltaic inverter device is abruptly increased. That is, the voltage changes from a point I1 to a point I2 as shown in FIG. 5. When a plurality of photovoltaic modules stop outputting voltages to the photovoltaic inverter device simultaneously, the voltage inputted to the photovoltaic inverter device changes from the point I1 to a point I3 as shown in FIG. 5. In order to stabilize the bus voltage, voltages outputted by the photovoltaic modules in operation currently are reduced to avoid a sharp change in the voltage inputted to the photovoltaic inverter device.

Specifically, the voltages outputted by the photovoltaic modules may be adjusted by adjusting currents of the photovoltaic modules, and the present disclosure is not limited thereto. During the photovoltaic inverter device reducing the voltages outputted by the photovoltaic modules, some photovoltaic modules may output too low voltages even less than the under-voltage threshold protection voltage and thus stop operating. At this time, the shutdown controller switches off shutdown devices connected to the photovoltaic modules in an under-voltage state. However, when the photovoltaic modules which have been switched off subsequently resume operating properly, the shutdown controller switches on the shutdown devices connected to the photovoltaic modules. In this way, a process that a plurality of photovoltaic modules output voltages to the photovoltaic inverter device simultaneously and then enter the under-voltage state is repeated, resulting in that the photovoltaic inverter device cannot operate stably.

Figure 6:
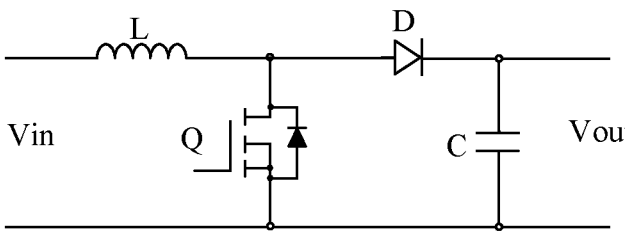
FIG. 6 is a schematic diagram of a DC/DC circuit according to the present disclosure.

For example, it is assumed that the photovoltaic system includes (L+M) photovoltaic modules that are connected in series and the photovoltaic inverter device is provided with a DC/DC (Direct Current/Direct Current) circuit and a DC/AC (Direct Current/Alternating Current) circuit. The DC/DC circuit performs voltage conversion on direct current power inputted via the photovoltaic module to stabilize the voltage inputted to the DC/AC circuit. When all photovoltaic modules each are in a stable operating state, the voltage outputted by the (L+M) photovoltaic modules, namely the voltage inputted to the DC/DC circuit, is expressed as $V_{in0}=V_m(L+M)$, where $V_m$ represents a voltage outputted by one photovoltaic module at a maximum power point. Referring to FIG. 6, FIG. 6 is a schematic diagram of a DC/DC circuit according to the present disclosure. Relationship between the voltage inputted to the DC/DC circuit and the voltage outputted by the DC/DC circuit meets an equation: $V_{out0}=V_{in0}/(1-D)$, where D represents a duty cycle of a switch transistor Q in the DC/DC circuit. As shown in FIG. 6, $V_{out0}$ represents a bus voltage at an input terminal of the DC/AC circuit. When M photovoltaic modules are shaded, the M photovoltaic modules output zero. In addition, shutdown devices connected to the M photovoltaic modules are switched off, and the M photovoltaic modules are bypassed by bypass diodes connected to output terminals of the M photovoltaic modules. At this time, the voltage outputted by the remaining L photovoltaic modules, namely the voltage inputted to the DC/DC circuit, is stabilized at $V_{in}=L*V_m$, and the bus voltage at the input terminal of the DC/AC circuit is equal to $V_{out}$.

When the shaded M photovoltaic modules resume operating and the shutdown devices connected to the M photovoltaic modules are switched on, the M photovoltaic modules output voltages simultaneously, so that a voltage outputted by the entire photovoltaic module string is increased to $V'_{in}=V_{in}+M*V_m$ abruptly and the bus voltage is increased to $V'_{out}=V'_{in}/(1-D)$ abruptly. In order to stabilize the bus voltage apace, the DC/AC circuit increases a current outputted by the DC/AC circuit to reduce the voltages outputted by the photovoltaic modules. In this way, the bus voltage is stabilized at $V_{out}$. The DC/AC circuit stabilizes the bus voltage in a very short time period, which is shorter than a time period in which the DC/DC circuit adjusts the voltages outputted by the photovoltaic modules to reach a maximum output power. Therefore, a sum of the voltages outputted by the (L+M) photovoltaic modules is reduced to $V_{in}$. That is, the voltage outputted by each photovoltaic module is equal to $V_{in}/(L+M)$. At this time, some photovoltaic modules may output too low voltages even reaching the under-voltage protection threshold voltage, which causes that these photovoltaic modules stop operating and shutdown devices connected to these photovoltaic modules are switched off, so that the voltage outputted by the entire photovoltaic module string, i.e., the voltage inputted to the DC/DC circuit, is reduced, resulting in a reduction of the bus voltage of the DC/AC circuit. As a result, the photovoltaic system cannot operate stably. In addition, when the photovoltaic modules outputting voltages reaching the under-voltage protection threshold voltage resume operating simultaneously, the above process is to be repeated inevitably. That is, there will always be a photovoltaic module that outputs a voltage reaching the under-voltage protection threshold voltage and thus stops operating, so that the photovoltaic inverter device cannot operate stably, affecting power generation.

In order to solve the above technical problem, according to the present disclosure, starting delays are set for the shutdown devices before the photovoltaic modules output voltages to the photovoltaic inverter device, to ensure that the shutdown devices are switched on at different time instants. In addition, the shutdown devices are switched on after the photovoltaic inverter device completes maximum power point tracking for realizing a stable input and a stable output of the photovoltaic inverter device, so as to prevent the photovoltaic inverter device from operating unstably resulted from that a plurality of photovoltaic modules output voltages simultaneously to the photovoltaic inverter device.

In addition, according to the present disclosure, the photovoltaic modules are switched on after the enabling signal is received, ensuring that the photovoltaic modules and the photovoltaic inverter device operate synchronously.

In a preferred embodiment, the generating of delays of the shutdown devices connected to the shutdown controller after the shutdown controller is started includes: determining preset delays determined in advance for the shutdown devices as the delays of the shutdown devices.

In the present embodiment, the preset delays of the shutdown devices are pre-stored in a processor. The preset delays of the shutdown devices are different, to reduce a probability that a plurality of photovoltaic modules output simultaneously, so as to reduce a possibility of a continuous sharp change in the voltage inputted to the photovoltaic inverter device resulted from that voltages outputted by the photovoltaic modules reach the under-voltage protection threshold voltage, which reduces the impact on service life of components, thereby improving the stability of the photovoltaic inverter device.

Figure 7:
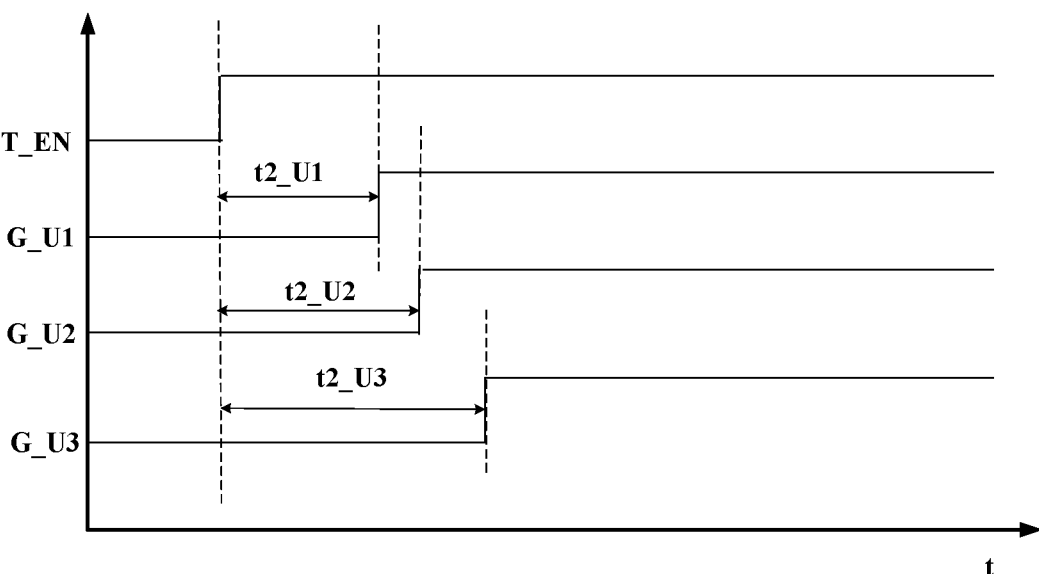
FIG. 7 is a schematic diagram of switching on a shutdown device in a delayed manner according to the present disclosure.

As shown in FIG. 7, FIG. 7 is a schematic diagram of switching on a shutdown device in a delayed manner according to the present disclosure. FIG. 7 shows a case that the shutdown device is switched on in a delayed manner. In FIG. 7, T_EN represents a control signal, G_U1, G_U2 and G_U3 represent three different shutdown devices respectively, and t2_U1, t2_U2 and t2_U3 represent starting times of the three shutdown devices respectively. Each of the three shutdown devices is switched on after the different preset delay elapses.

Figure 8:
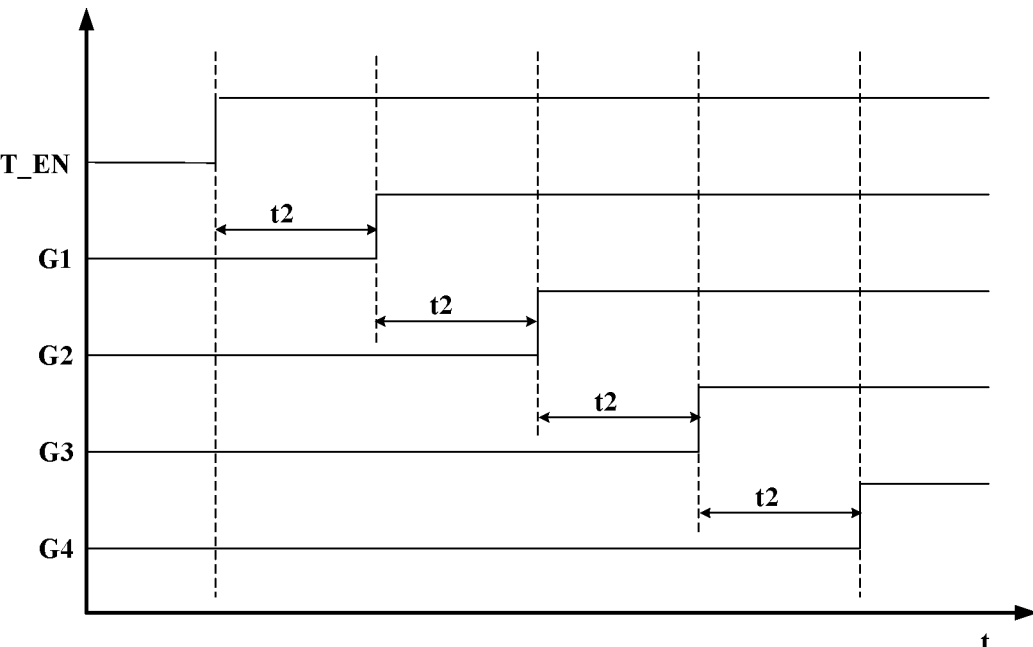
FIG. 8 is another schematic diagram of switching on a shutdown device in a delayed manner according to the present disclosure.
Figure 9:
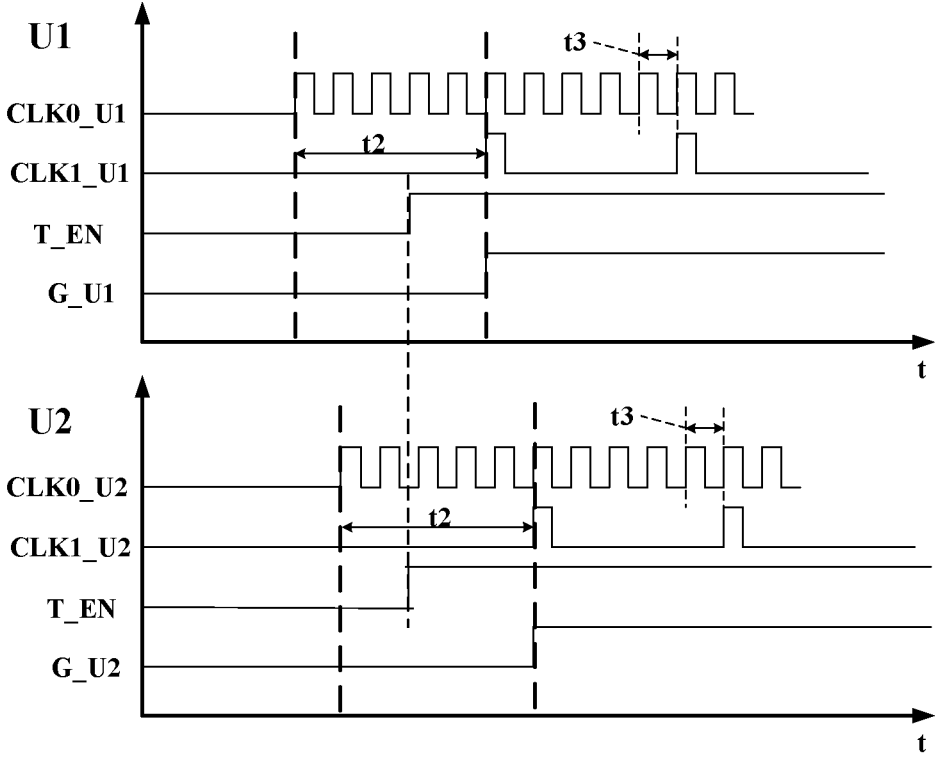
FIG. 9 is a schematic diagram of switching on a shutdown device in a delayed manner under control of a clock signal according to the present disclosure.

As shown in FIG. 8, FIG. 8 is another schematic diagram of switching on a shutdown device in a delayed manner according to the present disclosure. In FIGS. 8, G1, G2, G3 and G4 represent a first shutdown device, a second shutdown device, a third shutdown device and a fourth shutdown device respectively. The shutdown devices are switched on at intervals of t2.

Apparently, a way to set the preset delays of the shutdown devices is not limited in the present disclosure.

In a preferred embodiment, before generating delays of the shutdown devices connected to the shutdown controller after the shutdown controller is started, the method further includes: starting the shutdown controller after a starting delay corresponding to the shutdown controller elapses from a time instant when the shutdown controller is powered on, wherein the shutdown controllers are different in the starting delay.

In the present embodiment, the photovoltaic system is usually provided with more than one shutdown controller and a same shutdown controller controls one or more shutdown devices simultaneously. In a case that a plurality of shutdown controllers are started simultaneously, shutdown devices controlled by the plurality of shutdown controllers are switched on simultaneously, resulting in that a plurality of photovoltaic modules output voltages to the photovoltaic inverter device simultaneously. In order to avoid the case described above, according to the present disclosure, the shutdown controller is started after a starting delay corresponding to the shutdown controller elapses from a time instant when the shutdown controller is powered on, to ensure that the shutdown controllers are not started simultaneously, so as to prevent the plurality of photovoltaic modules from outputting voltages to the photovoltaic inverter device simultaneously, thereby ensuring stable operation of the photovoltaic inverter device.

In a preferred embodiment, before starting the shutdown controller after a starting delay corresponding to the shutdown controller elapses from a time instant when the shutdown controller is powered on, the method further includes: generating correspondence between a restarting ordinal and a starting delay of the shutdown controller; and determining the starting delay of the shutdown controller based on the current restarting ordinal of the shutdown controller and the correspondence.

In the present embodiment, the starting delay of the shutdown controller is determined based on the correspondence between restarting ordinal and the starting delay of the shutdown controller.

For example, if it is restarted for the first time, after the shutdown controller is restarted to be powered on, the starting delay of the shutdown controller is set to be one second. If it is restarted for the third time, after the shutdown controller is restarted to be powered on, the starting delay of the shutdown controller is set to be three seconds. That is, a number corresponding to the starting ordinal of the shutdown controller is set to be the same as a number corresponding to the starting delay of the shutdown controller in seconds. In the present disclosure, for each operating cycle, starting delays of the shutdown controllers are determined based on starting ordinals of the shutdown controllers in the operating cycle. After each operating cycle ends, the starting ordinals of the shutdown controllers are reset to zero and recounted.

The shutdown controllers are different in starting ordinal, so that the shutdown controllers are started at different time instants, to reduce a probability that a plurality of photovoltaic modules output simultaneously. Thus, it is possible to reduce a possibility of a continuous sharp change in the voltage inputted to the photovoltaic inverter device resulted from that voltages outputted by the photovoltaic modules reach the under-voltage protection threshold voltage, thereby reducing the impact on service life of components.

Apparently, a way to set the starting times of the shutdown devices is not limited in the present disclosure.

In a preferred embodiment, before determining whether a voltage inputted to the shutdown controller is reduced to a preset protection voltage, the method further includes: enabling a first preset clock signal and a second preset clock signal after the shutdown controller is started, where a first clock period of the first preset clock signal is greater than the duration of the maximum power point tracking, and a second clock period of the second preset clock signal is a preset multiple of the first clock period; and switching on a j-th shutdown device after a j-th cycle of the second clock signal elapses if the enabling signal is received, to cause a photovoltaic module connected to the j-th shutdown device to output a voltage to the photovoltaic inverter device, where N is greater than or equal to j and j is a positive integer.

In the present embodiment, after the shutdown controller is started, for switching on the shutdown devices, the first preset clock signal and the second preset clock signal are generated in advance to which the present disclosure is not limited. The second clock period of the second preset clock signal is a preset multiple of the first clock period of the first preset clock signal, and the first clock period is greater than the duration of the maximum power point tracking, to ensure that the second clock period is absolutely greater than the duration of the maximum power point tracking. Thus, the shutdown devices are switched on one by one at intervals of the second clock period after the enabling signal is received, thereby preventing a plurality of photovoltaic modules from outputting voltages to the photovoltaic inverter simultaneously.

Figure 10:
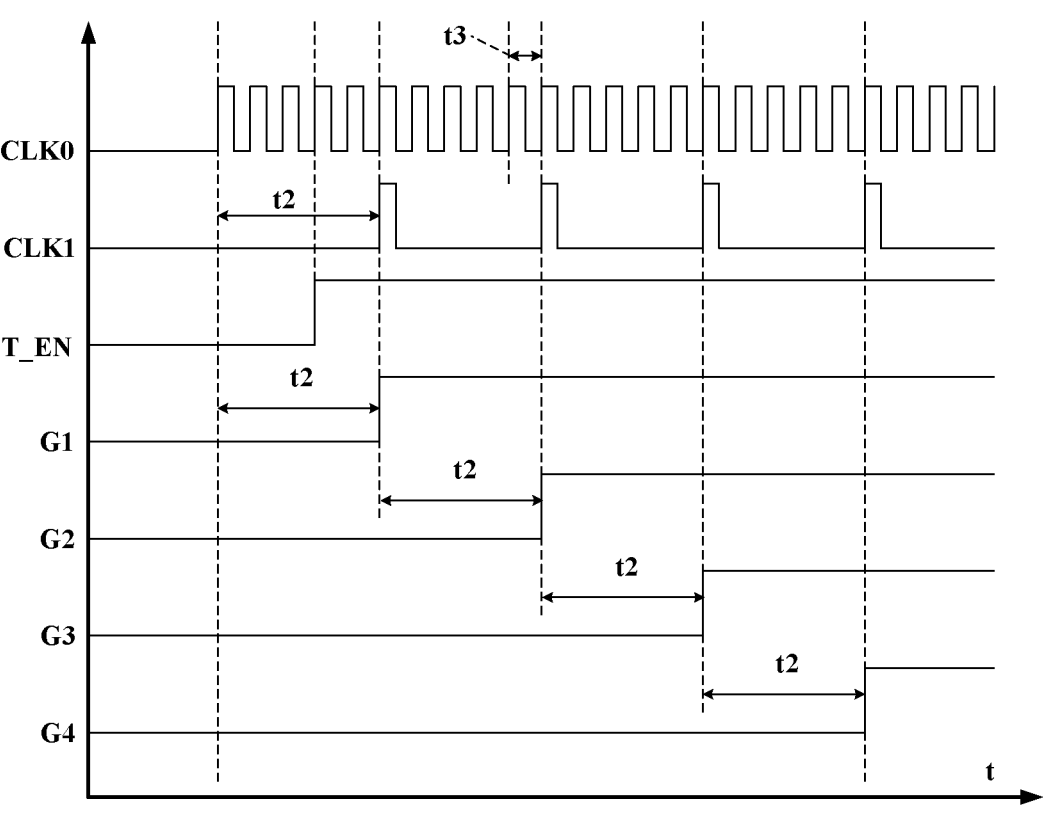
FIG. 10 is another schematic diagram of switching on a shutdown device in a delayed manner under control of a clock signal according to the present disclosure.

As shown in FIG. 3, FIG. 4, FIG. 9 and FIG. 10, FIG. 9 is a schematic diagram of switching on a shutdown device in a delayed manner under control of a clock signal according to the present disclosure, and FIG. 10 is another schematic diagram of switching on a shutdown device in a delayed manner under control of a clock signal according to the present disclosure. In FIG. 3, FIG. 4, FIG. 9 and FIG. 10, t3 represents the first clock period, t2 represents the second clock period, CLK0 represents the first preset clock signal, and CLK1 represents the second preset clock signal. The second clock period may be and not limited to five times of the first clock period. T_EN in the Figures represents the enabling signal.

Figure 11:
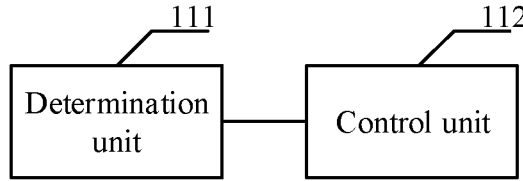
FIG. 11 is a schematic structural diagram of a system for controlling shutdown devices according to the present disclosure.

Reference is made to FIG. 11, which is a schematic structural diagram of a system for controlling shutdown devices according to the present disclosure. The system is applied to a shutdown controller. Each shutdown controller controls a plurality of shutdown devices, and the shutdown devices are arranged at positive output terminals of photovoltaic modules in one-to-one correspondence. Photovoltaic modules corresponding to a same shutdown controller are connected in series via shutdown devices connected to the photovoltaic modules to form a photovoltaic module string. A positive output terminal of the photovoltaic module string is connected to a positive input terminal of a photovoltaic inverter device, and a negative output terminal of the photovoltaic module string is connected to a negative input terminal of the photovoltaic inverter device. A bypass diode is connected in parallel between the positive output terminal and the negative output terminal of the photovoltaic module. The system includes a determination unit 111 and a control unit 112.

The determination unit 111 is configured to determine whether a voltage inputted to the shutdown controller is reduced to a preset protection voltage which is greater than a under-voltage protection threshold voltage.

The control unit 112 is configured to switch off a shutdown device connected to a power supply photovoltaic module supplying power to the shutdown controller if the voltage inputted to the shutdown controller is reduced to the preset protection voltage, to cause a bypass diode connected to the power supply photovoltaic module to bypass the power supply photovoltaic module and cause the power supply photovoltaic module to supply power only to the shutdown controller.

For the introduction of the system for controlling shutdown devices according to the present disclosure, reference may be made to the above method embodiments, which will not be repeated herein.

Figure 12:
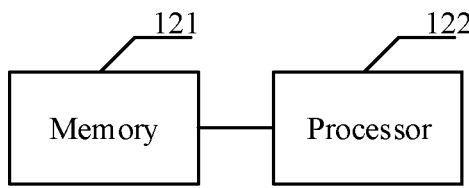
FIG. 12 is a schematic structural diagram of an apparatus for controlling shutdown devices according to the present disclosure.

Reference is made to FIG. 12, which is a schematic structural diagram of an apparatus for controlling shutdown devices according to the present disclosure. The apparatus includes a memory 121 and a processor 122.

The memory 121 stores a computer program.

The processor 122 is configured to execute the computer program to implement steps of the method for controlling shutdown devices as described above.

For the introduction of the apparatus for controlling shutdown devices according to the present disclosure, reference may be made to the above method embodiments, which will not be repeated herein.

A shutdown controller is further provided according to the present disclosure. The shutdown controller includes the apparatus for controlling shutdown devices described above, and further includes a control-signal sampling module and a communication module.

The control-signal sampling module is configured to sample an enabling signal outputted by a photovoltaic inverter device.

An input terminal of the communication module is connected to the control-signal sampling module, and an output terminal of the communication module is connected to an input terminal of the apparatus for controlling shutdown devices. The communication module is configured to transmit the enabling signal to the apparatus for controlling shutdown devices.

For the introduction of the shutdown controller according to the present disclosure, reference may be made to the above method embodiments, which will not be repeated herein.

It should be further noted that relation terms such as "first" and "second" herein are only used to distinguish one entity or operation from another entity or operation, and does not necessarily require or imply that there is an actual relation or sequence between these entities or operations. Moreover, terms "comprise", "include", or any other variants thereof are intended to encompass a non-exclusive inclusion, such that a process, method, article, or device including a series of elements includes not only those elements but also other elements that are not explicitly listed, or elements that are inherent to such process, method, article, or device. Unless explicitly limited, the statement "including a . . . " does not exclude the case that other similar elements exist in the process, method, article or device including the enumerated elements.

Those skilled in the art can implement or practice the present disclosure based on the above description of the disclosed embodiments. Various modifications to these embodiments are obvious to those skilled in the art, and the general principles defined herein can be implemented in other embodiments without departing from the spirit and scope of the present disclosure. Therefore, the present disclosure should not be limited to the embodiments disclosed herein, but has the widest scope in accordance to the principle and the novel features disclosed herein.

The invention claimed is:

1. A method for controlling shutdown devices, wherein the method is applied to shutdown controllers, each of the shutdown controllers controls a plurality of the shutdown devices that are arranged at positive output terminals of photovoltaic modules in one-to-one correspondence, the photovoltaic modules corresponding to a same one of the shutdown controllers are connected in series via the shutdown devices connected to the photovoltaic modules to form a photovoltaic module string, a positive output terminal of the photovoltaic module string is connected to a positive input terminal of a photovoltaic inverter device, a negative output terminal of the photovoltaic module string is connected to a negative input terminal of the photovoltaic inverter device, a bypass diode is connected in parallel between a positive output terminal and a negative output terminal of each of the photovoltaic modules, and the method comprises:

determining whether a voltage inputted to one of the shutdown controllers is reduced to a preset protection voltage which is greater than a under-voltage protection threshold voltage; and switching off a shutdown device connected to a power supply photovoltaic module supplying power to the one of the shutdown controllers if the voltage inputted to the one of the shutdown controllers is reduced to the preset protection voltage, to cause the bypass diode connected to the power supply photovoltaic module to bypass the power supply photovoltaic module and cause the power supply photovoltaic module to supply power only to the one of the shutdown controllers.

2. The method for controlling shutdown devices according to claim 1, wherein before determining whether a voltage inputted to one of the shutdown controllers is reduced to a preset protection voltage, the method further comprises:

generating delays of the shutdown devices connected to the one of the shutdown controllers after the one of the shutdown controllers is started, wherein the delays each are greater than duration for which the photovoltaic inverter device performs maximum power point tracking, an absolute value of a difference between a delay of an (i+1)-th shutdown device and a delay of an i-th shutdown device is greater than the duration for which the photovoltaic inverter device performs the maximum power point tracking, N is greater than i and represents the total number of the shutdown devices connected to the one of the shutdown controllers, and N and i are each a positive integer;

determining whether an enabling signal outputted by the photovoltaic inverter device is received; and switching on one of the shutdown devices after the delay corresponding to the one of the shutdown devices elapses if the enabling signal is received, to cause the photovoltaic module connected to the one of the shutdown devices to output a voltage to the photovoltaic inverter device.

3. The method for controlling shutdown devices according to claim 2, wherein the generating of delays of the shutdown devices connected to the one of the shutdown controllers after the one of the shutdown controllers is started comprises:

determining preset delays determined in advance for the shutdown devices as the delays of the shutdown devices.

4. The method for controlling shutdown devices according to claim 2, wherein before generating delays of the shutdown devices connected to the one of the shutdown controllers after the one of the shutdown controllers is started, the method further comprises:

starting the one of the shutdown controllers after a starting delay corresponding to the one of the shutdown controllers elapses from a time instant when the one of the shutdown controllers is powered on, wherein the shutdown controllers are different in the starting delay.

5. The method for controlling shutdown devices according to claim 4, wherein before starting the one of the shutdown controllers after a starting delay corresponding to the one of the shutdown controllers elapses from a time instant when the one of the shutdown controllers is powered on, the method further comprises:

generating correspondence between a restarting ordinal and the starting delay of the one of the shutdown controllers; and determining the starting delay of the one of the shutdown controllers based on the current restarting ordinal of the one of the shutdown controllers and the correspondence.

6. The method for controlling shutdown devices according to claim 2, wherein before determining whether a voltage inputted to one of the shutdown controllers is reduced to a preset protection voltage, the method further comprises:

enabling a first preset clock signal and a second preset clock signal after the one of the shutdown controllers is started, wherein a first clock period of the first preset clock signal is greater than the duration for which the photovoltaic inverter device performs the maximum power point tracking, and a second clock period of the second preset clock signal is a preset multiple of the first clock period; and switching on a j-th shutdown device after a j-th cycle of the second clock signal elapses if the enabling signal is received, to cause a photovoltaic module connected to the j-th shutdown device to output a voltage to the photovoltaic inverter device, wherein N is greater than or equal to j and j is a positive integer.

7. The method for controlling shutdown devices according to claim 1, wherein after switching off a shutdown device connected to a power supply photovoltaic module supplying power to the one of the shutdown controllers, the method further comprises:

determining whether the voltage inputted to the one of the shutdown controllers is reduced to the under-voltage protection threshold voltage; and switching off the shutdown devices connected to the one of the shutdown controllers if the voltage inputted to the one of the shutdown controllers is reduced to the under-voltage protection threshold voltage.

8. An apparatus for controlling shutdown devices, comprising:

a memory configured to store a computer program; and a processor configured to execute the computer program to implement the method for controlling shutdown devices according to claim 1.

9. A shutdown controller, comprising:

the apparatus for controlling shutdown devices according to claim 8;

a control-signal sampling module configured to sample an enabling signal outputted by a photovoltaic inverter device; and a communication module configured to transmit the enabling signal to the apparatus for controlling shutdown devices, wherein an input terminal of the communication module is connected to the control-signal sampling module, and an output terminal of the communication module is connected to an input terminal of the apparatus for controlling shutdown devices.

10. A system for controlling shutdown devices, wherein the system is applied to shutdown controllers, each of the shutdown controllers controls a plurality of shutdown devices that are arranged at positive output terminals of photovoltaic modules in one-to-one correspondence, the photovoltaic modules corresponding to a same one of the shutdown controllers are connected in series via shutdown devices connected to the photovoltaic modules to form a photovoltaic module string, a positive output terminal of the photovoltaic module string is connected to a positive input terminal of a photovoltaic inverter device, a negative output terminal of the photovoltaic module string is connected to a negative input terminal of the photovoltaic inverter device, a bypass diode is connected in parallel between a positive output terminal and a negative output terminal of each of the photovoltaic modules, and the system comprises:

a determination unit configured to determine whether a voltage inputted to one of the shutdown controllers is reduced to a preset protection voltage which is greater than a under-voltage protection threshold voltage; and a control unit configured to switch off a shutdown device connected to a power supply photovoltaic module supplying power to the one of the shutdown controllers if the voltage inputted to the one of the shutdown controllers is reduced to the preset protection voltage, to cause the bypass diode connected to the power supply photovoltaic module to bypass the power supply photovoltaic module and cause the power supply photovoltaic module to supply power only to the one of the shutdown controllers.

* * * * *